United States Patent
Nickel et al.

(10) Patent No.: US 8,166,736 B2
(45) Date of Patent: May 1, 2012

(54) CROP-CONDITIONING APPARATUS HAVING HYDRAULIC TENSION MECHANISM

(75) Inventors: Dwight E. Nickel, Newton, KS (US); Michael L. O'Halloran, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 13/156,691

(22) Filed: Jun. 9, 2011

(65) Prior Publication Data

US 2011/0232248 A1 Sep. 29, 2011

Related U.S. Application Data (63) Continuation of application No. 11/130,912, filed on May 17, 2005, now Pat. No. 7,958,708, which is a continuation of application No. 10/716,834, filed on Nov. 19, 2003, now Pat. No. 6,996,961.

(51) Int. Cl.
*A01D 61/00* (2006.01)

(52) U.S. Cl. .................................................. 56/16.4 C

(58) Field of Classification Search ............... 56/16.4 C, 56/16.4 R, 10 B, 10.2 R, 51, 53, 60, DIG. 15; 460/7, 1, 25
See application file for complete search history.

(56) References Cited

U.S. PATENT DOCUMENTS

| | | | | | |
|---|---|---|---|---|---|
| 3,513,645 | A | * | 5/1970 | Garrett et al. ........................ | 56/1 |
| 4,546,599 | A | * | 10/1985 | Cicci et al. .................. | 56/16.4 R |
| 4,896,483 | A | * | 1/1990 | O'Halloran et al. ................. | 56/1 |
| 5,022,219 | A | * | 6/1991 | Knurr et al. ................. | 56/16.4 R |
| 5,269,124 | A | * | 12/1993 | Barthel et al. ............. | 56/16.4 B |
| 6,029,432 | A | * | 2/2000 | Kraus et al. ................. | 56/16.4 B |
| 6,050,070 | A | * | 4/2000 | Cook ............................. | 56/14.1 |
| 6,062,010 | A | * | 5/2000 | Kraus et al. ................. | 56/16.4 R |
| 6,158,201 | A | * | 12/2000 | Pruitt et al. ......................... | 56/6 |
| 6,584,755 | B2 | * | 7/2003 | Holtkotte .................... | 56/10.2 B |

\* cited by examiner

*Primary Examiner* — Arpad Fabian-Kovacs (57) ABSTRACT

As crop materials are severed from the field, they pass through two successive pairs of counter-rotating conditioning rolls before being returned to the ground. The front rolls are preferably ribbed, metal rolls wherein the ribs of one roll are intermeshed with those of the other roll so as to crimp the stems of the crop materials as they pass between the rolls. The hard metal ribs also aggressively feed the materials rearwardly into the second set of rolls, which are preferably compressive surface rolls made of rubber or the like and provided with wide, intermeshed bars about their periphery. The tension mechanism for the rolls includes single-acting hydraulic cylinders that squeeze the rolls together to the extent permitted by adjustable stop structure used to set gaps between the rolls. An accumulator is hydraulically connected to the hydraulic cylinders for cushioning the tension mechanism.

16 Claims, 8 Drawing Sheets

CROP-CONDITIONING APPARATUS HAVING HYDRAULIC TENSION MECHANISM

CROSS-REFERENCE TO RELATED APPLICATIONS

The present application is a continuation application of co-pending, identically-titled U.S. patent application Ser. No. 11/130,912, filed May 17, 2005, which is a continuation application of U.S. patent application Ser. No. 10/716,834, filed Nov. 19, 2003, entitled METHOD AND APPARATUS FOR CONDITIONING CROP MATERIALS, now U.S. Pat. No. 6,996,961, both of which are hereby incorporated by reference herein.

TECHNICAL FIELD

This invention relates to the field of crop harvesting equipment and, more particularly, to a method and apparatus for obtaining conditioned crop materials with improved drying characteristics by passing the harvested materials between successive sets of paired conditioning rolls.

BACKGROUND AND SUMMARY

It is known in the art to pass harvested materials, such as hay, through multiple sets of paired, oppositely rotating rolls in an effort to condition, crush, and/or macerate the stems of the crop materials. See, for example, U.S. Pat. No. 6,050,070 issued to Ivan J. Cook on Apr. 18, 2000. See also a commercially available machine sold under the trade name and mark MACERATOR 6600 by AgLand Industries Inc. of Arborg, Manitoba Canada. However, for a variety of reasons, the prior art systems have not been entirely satisfactory.

The present invention provides a novel method and apparatus for obtaining improved crop conditioning. It also provides greater flexibility for the operator to choose the degree of conditioning to which the crop materials will be subjected. In a preferred form of the invention, two sets of paired, oppositely rotating rolls are used, with the front pair comprising a pair of non-compressible, metal rolls having longitudinally extending helical ribs about their periphery to perform a conditioning and feeding action. The ribbed metal rolls feed the conditioned materials directly to a rear pair of counter-rotating compressible surface rolls having longitudinally extending, relatively wide helical bars about their periphery. Like the narrow ribs on the front rolls, the wide bars on the rear rolls intermesh so as to provide an aggressive conditioning action as the crop materials pass between the rear rolls. Each set of rolls can be readily adjusted to control the tension force maintained on the rolls and the gap between the rolls.

The tension mechanism for the rolls includes a hydraulic circuit that utilizes at least one hydraulic cylinder connected to a moveable roll of each pair. The circuit containing the cylinder may be pressurized up to a certain selected level and then maintained at such level by closing a control valve to trap fluid against escape to the reservoir. Preferably, a compressible gas accumulator is connected in parallel fluid flow relationship with the cylinder to provide a yieldable, cushioning effect. The tension on the front rolls can be adjusted separately from the tension on the rear rolls. The front and rear rolls are mounted in such a way that the front rolls can move apart independently from the rear rolls and vice versa.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. For example, the present invention has been illustrated in connection with a self-propelled harvester. However, it will be appreciated that the principles of the present invention are not limited to use in a harvester, self-propelled or otherwise, and may readily be incorporated into a machine that does not sever crop materials from the field but only performs a separate conditioning function. Furthermore, while the harvester selected for purposes of illustration is a sickle-type machine utilizing a reel and cross-augers, the principles of the present invention also have utility in harvesters utilizing rotary cutoffs with no reels or augers.

Figure 1:
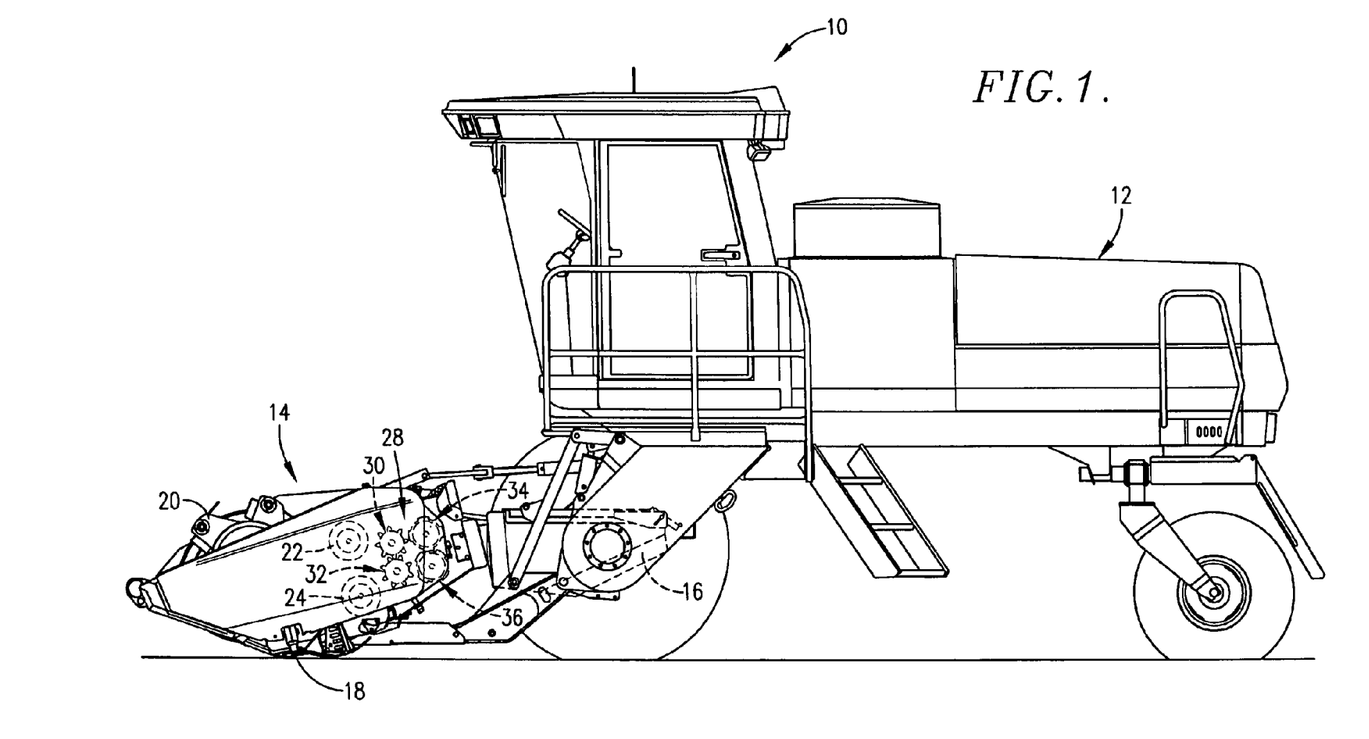
FIG. 1 is a side elevational view of a self-propelled harvester in the nature of a windrower incorporating the principles of the present invention.

The self-propelled windrower 10 in FIG. 1 broadly includes a tractor 12 and a header 14 mounted on the front end of tractor 12. Generally speaking, windrower 10 is capable of severing standing crop materials from the ground as tractor 12 advances header 14 across the field, conditioning the stems of such materials as they are passed rearwardly through header 14, and then returning the conditioned materials to the ground underneath tractor 12 in a windrow or swath depending upon the position of various forming shields 16 shown in phantom in FIG. 1. Header 14 in the illustrated embodiment has a reciprocating sickle 18 for severing standing materials from the ground, a rotating reel 20 for sweeping the standing materials into sickle 18 to improve cutoff, and a pair of vertically spaced, opposite rotating, full-length augers 22 and 24 that converge the severed crop centrally and propel it rearwardly as the machine advances. As shown particularly in FIGS. 6 and 7, header 14 has a rear opening 26 behind augers 22, 24 for receiving crop materials therefrom and admitting such materials into the crop conditioning mechanism therebehind broadly denoted by the numeral 28.

In accordance with the present invention, the conditioning mechanism 28 includes a pair of front, counter-rotating conditioning rolls 30 and 32 and a pair of rear, counter-rotating conditioning rolls 34 and 36. Front rolls 30, 32 have non-compressible surfaces made of a hard material such as steel, while rear rolls 34, 36 have compressible surfaces and are made of softer materials such as rubber, neoprene or elastomer. In one preferred embodiment, rear rolls 34, 36 are constructed from molded rubber layers that are cured and subsequently machined so as to provide a specially configured surface as explained in more detail below, although the rear rolls may instead be provided with smooth surfaces. Improved conditioning action can be obtained over a fairly wide range of hardness of the compressible surface on rolls 34, 36, but best results have been obtained using rubber having a hardness of 70-80 durometer.

Front conditioning rolls 30, 32 may take the form of fluted or ribbed steel rolls of the type used for many years in HESSTON brand windrowers and mower conditioners. Each of the front rolls 30, 32 thus has a series of radially outwardly projecting, somewhat triangular in cross section and relatively narrow ribs 38 that extend along the length of the roll in a helical pattern. Ribs 38 project outwardly from a cylindrical core 40 of each roll and are spaced around the roll in such a manner that the ribs on top roll 30 may intermesh with the ribs on bottom roll 32 during operation.

On the other hand, in the particular illustrated embodiment each of the rear rolls 34, 36 is provided with a series of radially outwardly projecting, relatively wide bars 42 that are fewer in number and wider than the ribs 38 on front rolls 30, 32. Bars 42 project outwardly from a cylindrical core 44 on each rear roll and extend longitudinally the full length of the roll in a helical pattern. Preferably, the bars 42 of upper and lower rear rolls 34, 36 are intermeshed with one another.

Front rolls 30, 32 are adapted for relative movement toward and away from one another. Similarly, rear rolls 34, 36 are adapted for relative movement toward and away from one another. In the illustrated embodiment, front rolls 30, 32 are mounted in such a way that lower roll 32 can move toward and away from upper roll 30 to a limited extent, while the vertical position of upper roll 30 remains fixed. This relationship could be reversed. On the other hand, upper rear roll 34 is mounted to move toward and away from lower rear roll 36 to a limited extent while the position of lower rear roll 36 remains fixed. This relationship could also be reversed. The details of construction permitting such mounting arrangement and movement are illustrated in particular in FIGS. 2, 4 and 6-8, it being noted that only the left ends of the rolls are illustrated in several of those figures. Thus, the following description will focus on the left end of the rolls, with the understanding that corresponding arrangements are provided at the right ends.

Figures 8, 9:
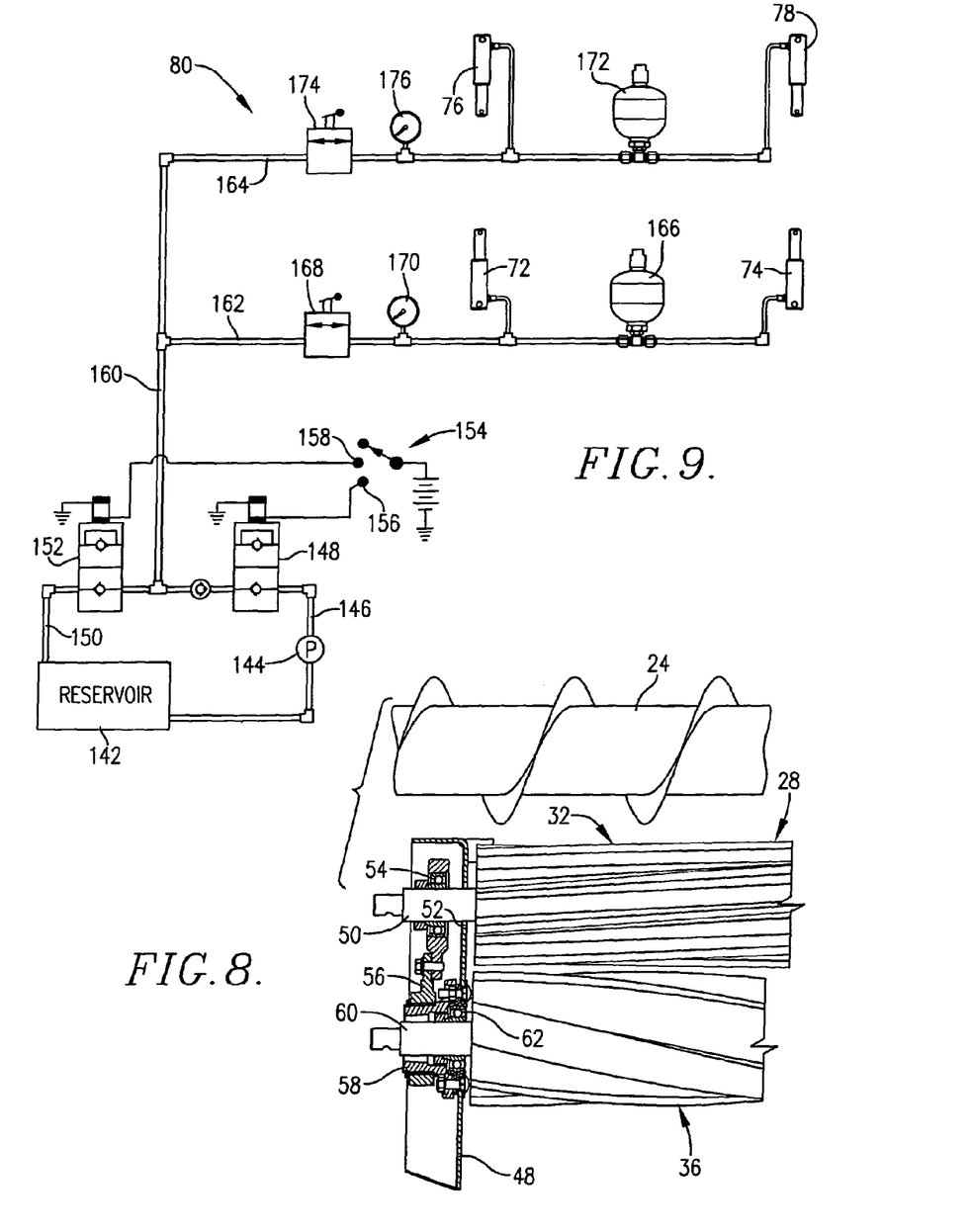
FIG. 8 is a fragmentary generally horizontal cross-sectional view looking downwardly through the two lower rolls illustrating their mounting arrangement and their relationship to the center-gathering augers in front of the rolls.
FIG. 9 is a schematic illustration of a simplified hydraulic circuit for applying tensioning force to the rolls.

All of the rolls are provided with stub shafts projecting outwardly from opposite ends thereof as exemplified by the stub shaft 44 of top front roll 30. The stub shaft 44 of top front roll 30 is journaled by bearings 46 that are in turn fixedly attached to an upright end wall 48 such that the axis of rotation of top front roll 30 does not move in any direction. On the other hand, the stub shaft 50 of lower front roll 32 passes through a generally upright slot 52 in end wall 48 and is journaled by a set of bearings 54 that are attached to a support assembly 56 swingable up and down about the axis of lower rear roll 34. Slot 52 is slightly arcuate with its center at the axis of the lower rear roll 36. As illustrated in FIG. 8, the rear end of support assembly 56 is pivotally mounted on a trunnion mount 58 that encircles the stub shaft 60 of lower rear roll 36 and is attached to a bearing 62 for stub shaft 60. Bearing 62, in turn, is fixedly secured to end wall 48 so as to remain in a fixed location at all times. The stub shaft 64 of upper rear roll 34 is journaled by a set of bearings (not shown) that are in turn carried by a vertically swingable support assembly 68 having its axis of swinging movement coinciding with the axis of top front roll 30. A trunnion mount 69 (FIG. 6) encircles stub shaft 44, pivotally supports the support assembly 68, and is fixed to bearing 46. Stub shaft 64 of upper rear roll 34 passes through a generally upright slot 70 in end wall 48, such slot 70 being slightly arcuate with its center at the axis of rotation of upper front roll 30.

Tension is applied to the rolls 30-36 by four single-acting tension hydraulic cylinders 72, 74, 76 and 78 as illustrated in FIG. 9. Tension cylinders 72 and 74 are used for applying tension to the front rolls 30-32, while the cylinders 76 and 78 are used for applying tension to the rear rolls 34, 36. Front cylinders 72, 74 are located at opposite ends of lower front roll 32, while rear cylinders 76, 78 are located at opposite ends of upper rear roll 34. More specifically, each front cylinder 72, 74 is secured to a corresponding end wall 48 along the lower front extremity thereof and projects upwardly therefrom for pivotal connection with the lower front extremity of support assembly 56. Correspondingly, each rear cylinder 76, 78 is secured to the upper rear extremity of an end wall 48 and projects downwardly therefrom for pivotal connection with the upper rear extremity of support assembly 68. Cylinders 72-78 thus comprise part of a tension mechanism broadly denoted by the numeral 80 in FIG. 9 that urges rolls 30, 32 and 34, 36 relatively toward one another and resists their separation.

Figure 2:
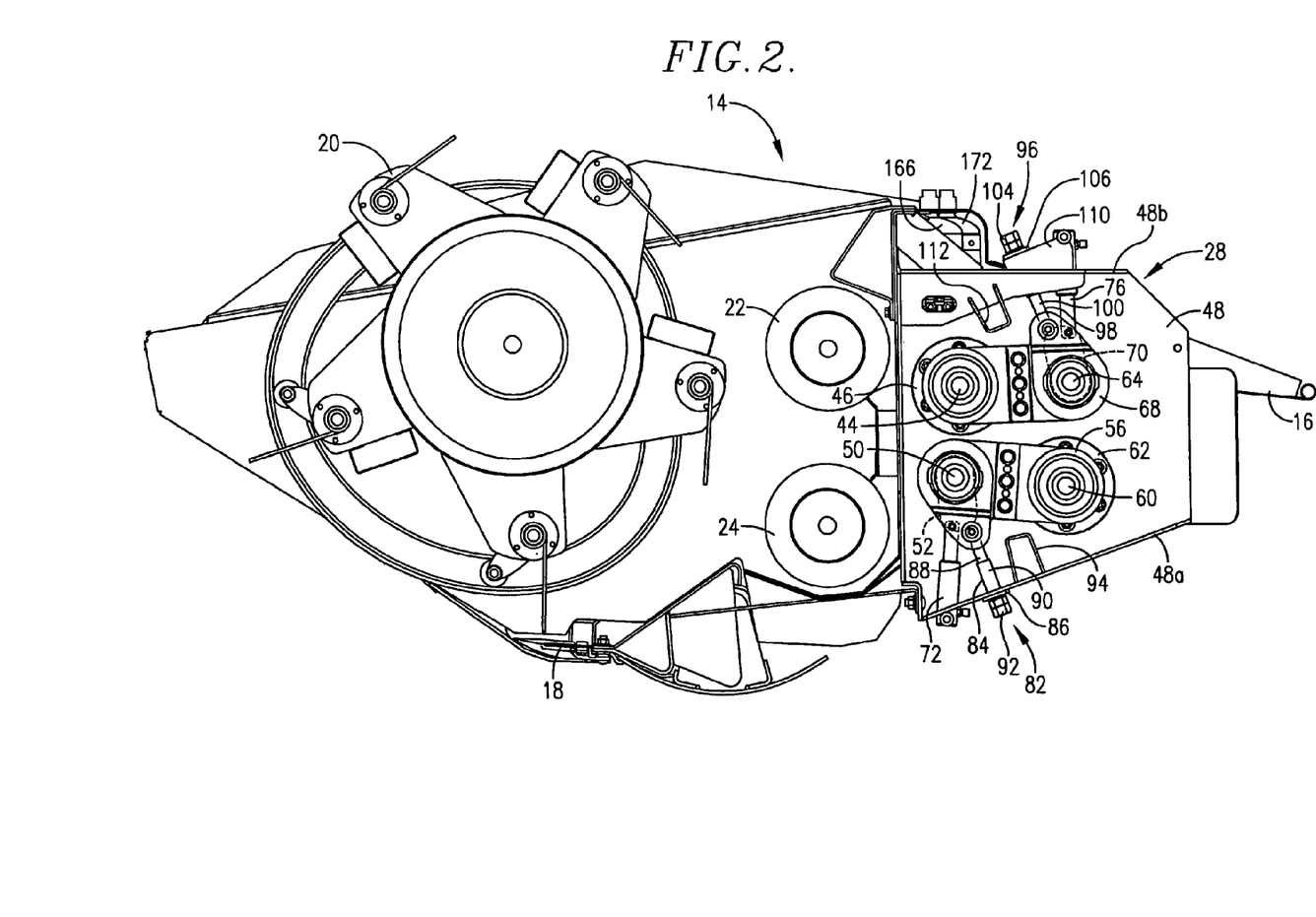
FIG. 2 is an enlarged side elevational view of the header of the windrower with end panel portions thereof removed to reveal details of construction, the rolls being illustrated in their close together positions.
Figure 3:
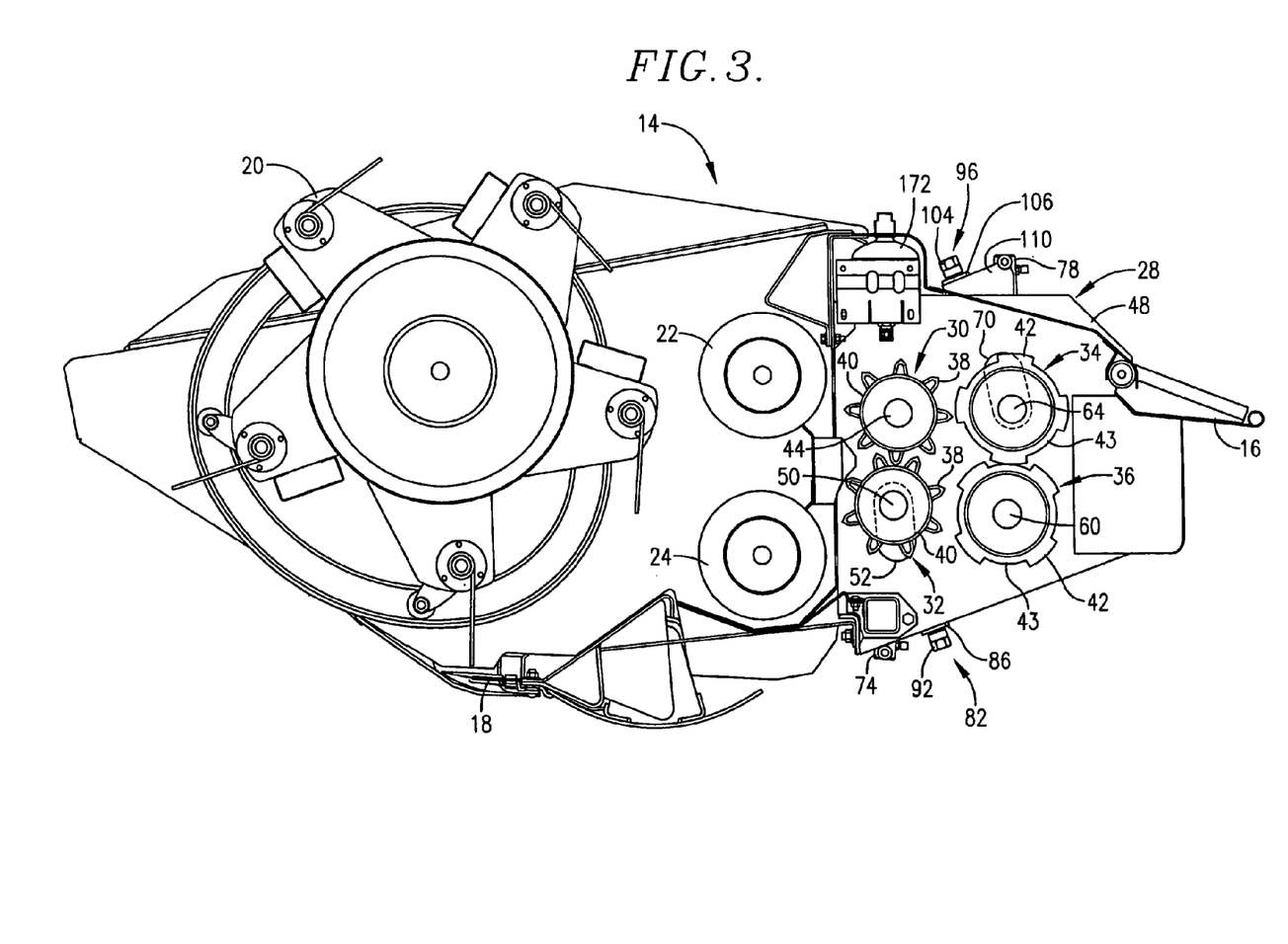
FIG. 3 is a side elevational view of the header similar to FIG. 2 but with additional structure removed to show the rolls in their close together positions of FIG. 2.
Figure 4:
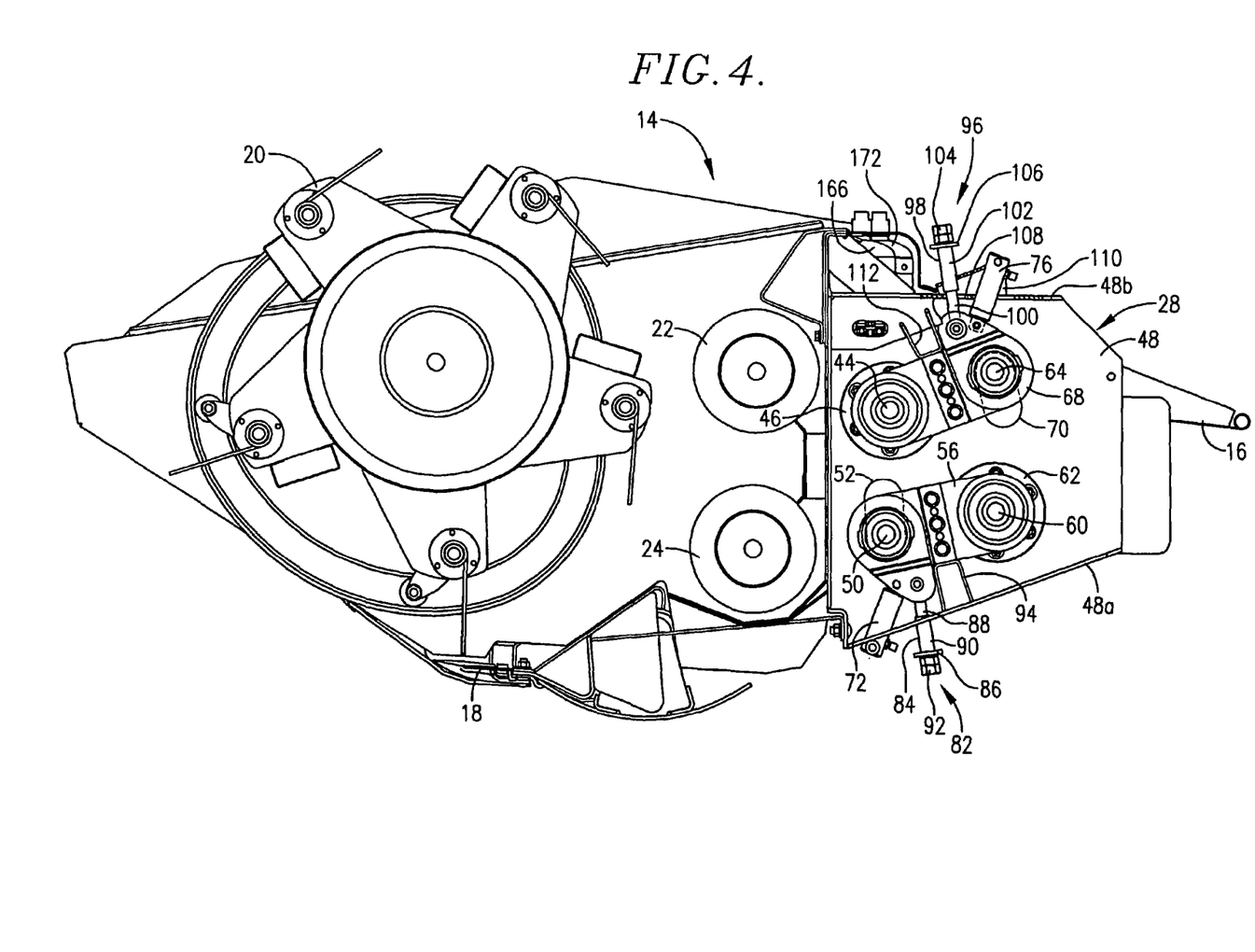
FIG. 4 is a side elevational view of the header similar to FIG. 2 but showing the rolls in their fully open and spaced apart positions.
Figure 5:
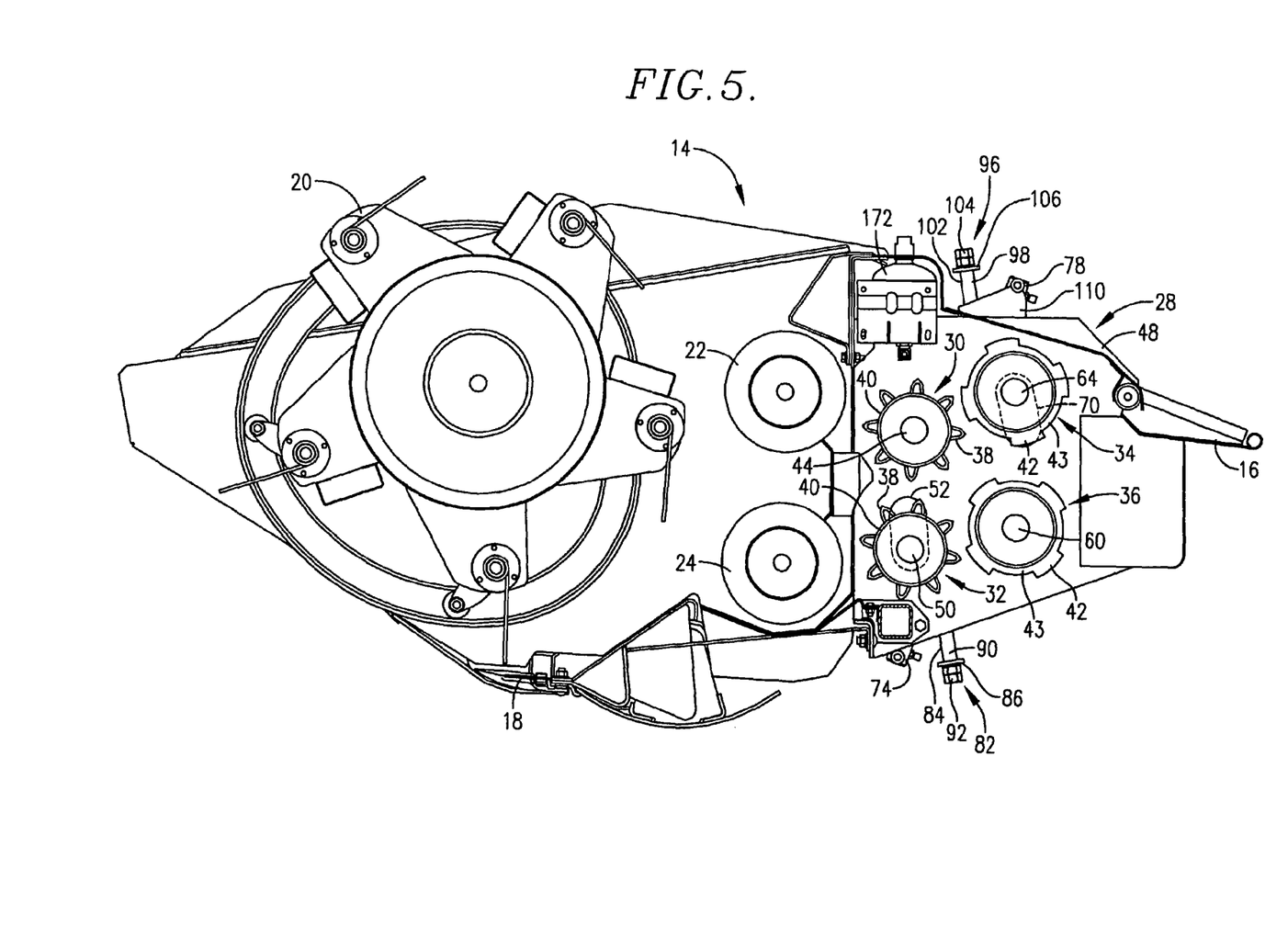
FIG. 5 is a side elevational view of the header similar to FIG. 3 but illustrating the rolls fully spaced apart corresponding to the condition of things in FIG. 4.

The front rolls 30, 32 are provided at their opposite ends with adjustable stop structure 82 for limiting movement of lower front roll 32 upwardly toward upper front roll 30. As illustrated, for example, in FIGS. 2 and 4, such stop structure 82 includes an elongated member 84 that passes through a hole (not shown) in an outturned flange 48a of the lower edge of end wall 48 and connects at its upper end to the lower front extremity of support assembly 56. Adjacent its lower end, member 84 is provided with a stop collar 86 that is adapted to abut the bottom side of outturned flange 48a when lower front roll 32 is in its full up position as illustrated in FIGS. 2 and 3. Preferably, the position of stop collar 86 is adjustable such that, in a preferred embodiment, a running gap can be established and adjusted between front rolls 30, 32. In one preferred embodiment, such adjustability is obtained by constructing elongated member 84 in such a manner that there are two relatively telescopic parts, namely an inner elongated shank 88 and an outer elongated sleeve 90 encircling inner shank 88. Outer sleeve 90 has stop collar 86 fixed to the lower end thereof, while inner shank 88 is pivotally joined with support assembly 56 at an upper end and carries a set of adjusting nuts 92 at a lower, threaded end. Thus, adjusting the position of nuts 92 on inner shank 88 changes the position of sleeve 90 along the length of shank 88 to correspondingly place stop collar 86 closer to or farther away from flange 48a. In the opposite direction, to limit the extent of downward movement of lower front roll 32 away from upper front roll 30, a stop bracket 94 is disposed to underlie and abut the lower edge of support assembly 56 as illustrated in FIG. 4, for example. A similar stop structure 82 and stop bracket 94 are provided on the right end of header 14.

Adjustable stop structure 96 is also provided for adjustably limiting the movement of upper rear roll 34 in a downward direction toward lower rear roll 36. As illustrated particularly in FIGS. 2 and 4, such adjustable stop structure 96 is preferably identical to stop structure 82. Like structure 82, stop structure 96 comprises an elongated member 98 that is preferably constructed from a pair of relatively telescoping parts, i.e., an inner shank 100 and an outer sleeve 102 that is axially slidable along shank 100. The lower end of the shank 100 is pivotally connected to support assembly 68, while the upper end of shank 100 is threaded to threadably receive a pair of adjustable nuts 104 that are adapted to bear against the outer face of a stop collar 106 on the upper end of sleeve 102. Member 98 passes through a hole 108 in an interned flange 48b along the upper extremity of end wall 48, and stop collar 106 is adapted to abut the upper extremity of a stop bracket 110 on end wall 48 when upper rear roll 34 is in its fully lowered position as illustrated, for example, in FIG. 2. In order to limit movement of upper rear roll 34 away from lower rear roll 36, a stop bracket 112 similar to stop bracket 94 is disposed above support assembly 68 for engagement with the upper extremity of assembly 68 when upper rear roll 34 is raised to its full extent and away from lower rear roll 36. Both ends of upper rear roll 34 are provided with stop structures 96 and with stop brackets 112.

Figure 6:
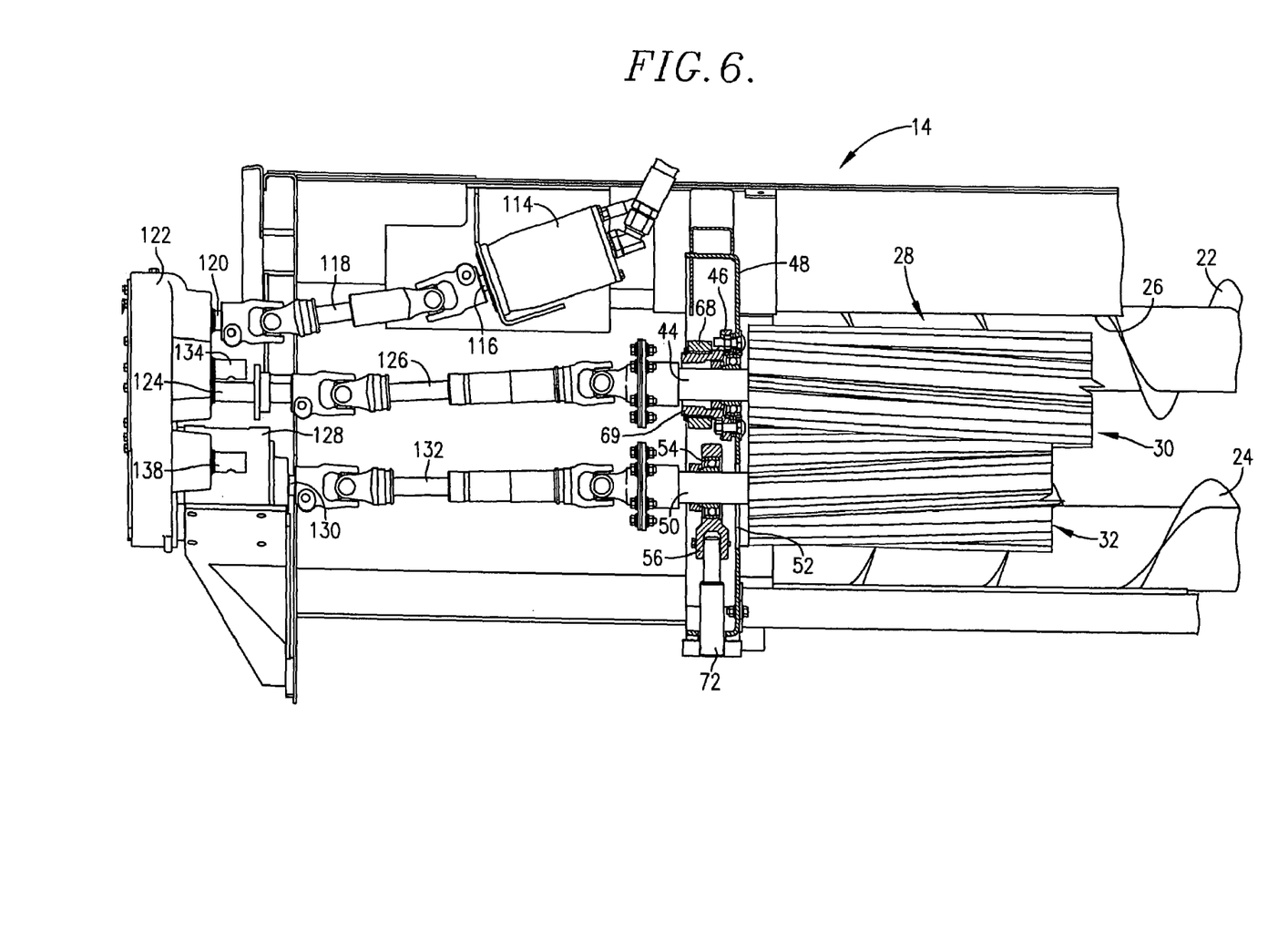
FIG. 6 is an enlarged, fragmentary, rear, vertical cross-sectional view taken immediately behind the front rolls and looking forwardly to reveal details of the mounting and drive arrangement for the front rolls.

As illustrated in FIG. 6, in one preferred embodiment the rolls 30, 32 and 34, 36 are hydraulically driven via a hydraulic motor 114 having an output shaft 116. Output shaft 116 is connected via a U-joint drive line to an input shaft 120 of a gear case 122. An output shaft 124 of gear case 122 supplies driving power to upper front roll 30 via a telescoping U-joint drive line 126 coupled with stub shaft 44, and a gear box 128 operably coupled with gear case 122 has an output 130 that supplies driving power to the lower front conditioning roll 32 via a telescoping U-joint drive line 132 operably coupled with stub shaft 50 of lower conditioning roll 32. Gear box 128 is preferably a right angle box that also supplies driving power to other components of header 14 such as, for example, the sickle 18, which may be a double sickle such that gearbox 128 would supply driving power only to the left half of the double sickle 18. A second right angle gear box (not shown) may be connected to the stub shaft on the opposite end of lower front roll 32 for the purpose of supplying driving power to the right end of such double sickle.

Figure 7:
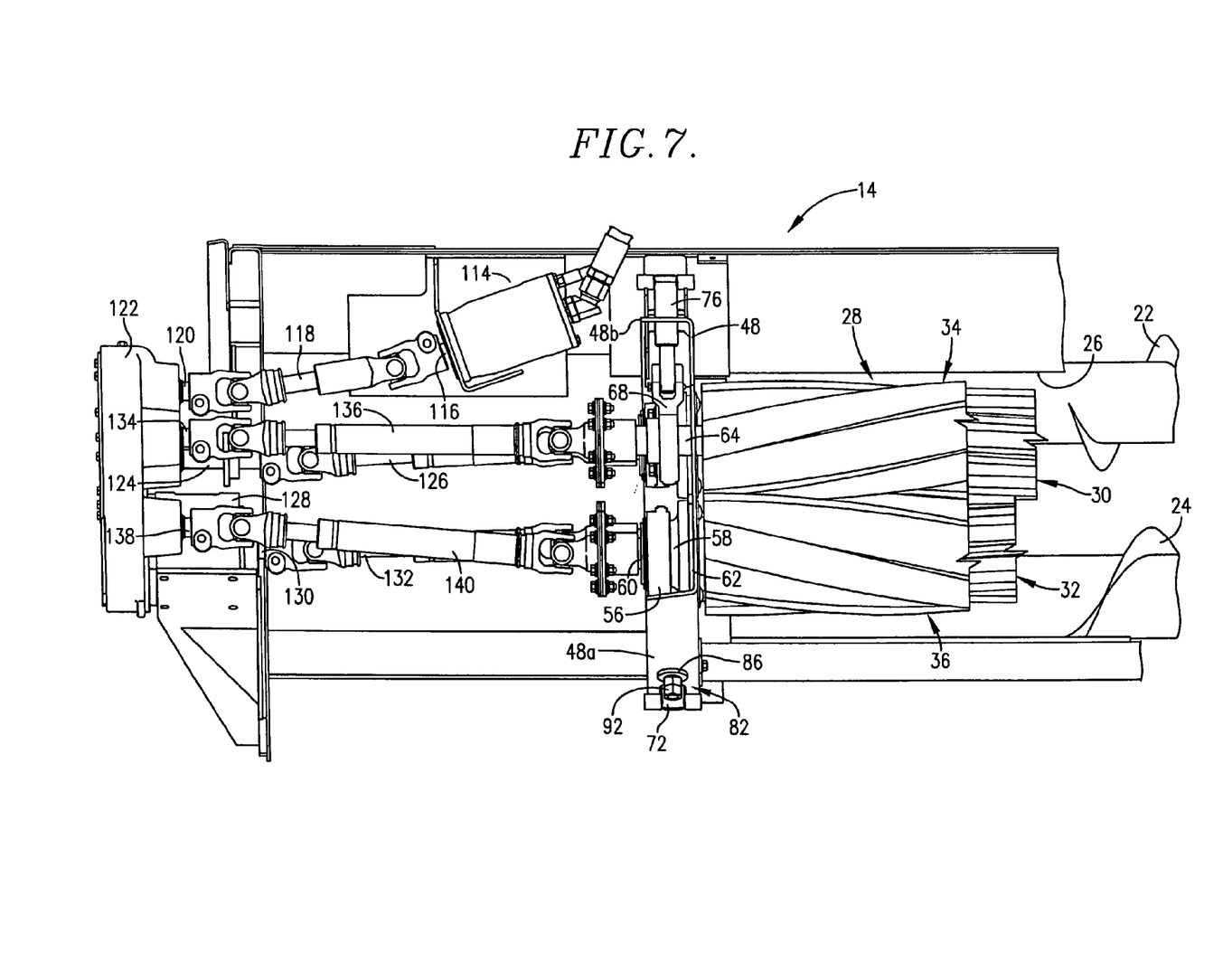
FIG. 7 is an enlarged, fragmentary rear, vertical cross-sectional view similar to FIG. 6 but taken further rearward than FIG. 6 from a point immediately behind the rear conditioning rolls and looking forwardly so as to reveal drive details for the rear rolls.

As shown in FIG. 7 in addition to FIG. 6, gear case 122 also is provided with an output shaft 134 that supplies driving power to the upper rear roll 34 via a telescoping U-joint drive line 136 operably coupled with stub shaft 64 of upper rear roll 34. Another output shaft 138 supplies driving power to lower rear roll 36 via a telescoping U-joint drive line 140 operably coupled with stub shaft 60 of lower rear roll 36.

As noted earlier, tension cylinders 72-78 comprise part of a tension mechanism broadly denoted by the numeral 80 and illustrated schematically in FIG. 9. In addition to the cylinders 72-78, tension mechanism 80 also includes a reservoir 142 that supplies hydraulic fluid to the rest of the system via a pump 144. Pump 144 is located in a supply line 146 leading from reservoir 142 and controlled by a solenoid-operated, two-position valve 148. A return line 150 to reservoir 142 is controlled by a two-position, solenoid-operated control valve 152. A three position switch 154, which may be conveniently located on header 14 itself or in the operating cab of tractor 12, may be used to energize solenoid valves 148 and 152. In the neutral position as shown, switch 154 maintains valves 148 and 152 in their closed positions such that no fluid may flow from pump 148 to the rest of the circuit, and no fluid may flow out of the circuit back to reservoir 142. However, when switch 154 is engaged with contact 156, solenoid valve 148 is actuated to allow the rest of the circuit to be charged with pressurized fluid. When switch 154 is moved into engagement with contact 158, solenoid valve 152 is actuated to allow the rest of the circuit to drain to reservoir 142. Switch 154 may be located either in the tractor cab or on header 14.

A main line 160 is teed into the supply line 146 and return line 150 between control valves 148 and 152. Main line 160 in turn branches into a front tension line 162 and a rear tension line 164. Front tension cylinders 72 and 74 are connected to front tension line 162 in parallel relation to one another so that both cylinders 72 and 74 receive pressurized oil simultaneously and discharge pressurized oil simultaneously. A suitable gas pressure accumulator 166, which may take the form of a number of readily commercially available units, is connected in parallel fluid flow communication with the two cylinders 72 and 74 for cushioning the conditioning tension branch of the circuit. A normally closed shut-off valve 168 is located in conditioning tension line 162 ahead of cylinders 72 and 74, along with a pressure-indicating meter 170 so that oil may be trapped within cylinders 72, 74 when valve 166 is closed. When valve 166 is open, cylinders 72, 74 may either be charged with oil or may discharge oil to reservoir 142, depending upon the position of solenoid valves 148 and 152. Valve 168 and meter 170 may be located either in the tractor cab or on the header 14.

Similarly, the rear tension line 164 has a compressive gas accumulator 172 connected thereto between rear tension cylinders 76 and 78 so as to cushion that part of the circuit. A normally closed shut-off valve 174 is located in line 164 above cylinders 76, 78, and a pressure indicating meter 176 is located in line 164 between valve 174 and the cylinders 76, 78. When valve 174 is closed, fluid is trapped in rear tension cylinders 76, 78, while when valve 174 is open, cylinders 76, 78 may either be charged with pressurized oil or may discharge oil to reservoir 142, depending upon the positions of the solenoid-powered control valves 148 and 152. Valve 174 and meter 176 may be located either in the tractor cab or on the header 14.

OPERATION

Different crop conditions may call for different pressure settings on the rolls as well as different gaps, if any, between the rolls. Moreover, there may be times when the operator simply wishes to change the degree or severity of conditioning of the crop materials. The present invention affords great flexibility in this respect.

Usually, but not necessarily, a gap is desired between front rolls 30, 32, and such gap may be somewhat larger than in conventional conditioning situations that use fluted steel rolls. The gap is measured between the outermost tip of one of the ribs 38 and the cylindrical core 40 of the opposing roll. Good results have been obtained where the gap is set in the range of 0.250 to 0.750 inches. Of course, the size of the gap during operations may temporarily increase significantly as slugs of material are passed therethrough and the lower roll 32 swings away from the upper roll 30. Preferably, the front rolls 30 and 32 do not touch one another.

Preferably, but not necessarily, the rear rolls 34, 36 are set to have a slight gap. Good results have been obtained where such gap is in the range of 0.001 to 0.250 inches. This insures that the wide bars 42 remain intermeshed with one another except when upper roll 34 must swing upwardly to pass a slug of material, thus assuring a powerful compressing action against the already crimped stems of materials from rolls 30 and 32. The resilient surface of rear rolls 34, 36 assists in applying the appropriate compressive force to the crop stems when the rolls are close together while allowing for manufacturing inaccuracies during formation of the long, helical bars 42.

Preferably, the front rolls 30, 32 rotate at essentially the same speeds as the rear rolls 34, 36, but somewhat faster than the gathering augers 22 and 24. This produces a condition in which the conditioning mechanism 28 tends to draw materials from augers 22, 24 such that there is little or no tendency for crop materials to accumulate upstream from front rolls 30, 32. Moreover, rear rolls 34 and 36 are positioned as close as possible to front rolls 30, 32 without making actual contact therewith. This increases the reliability of the transfer of materials from front rolls 30, 32 to rear rolls 34, 36.

To prepare the machine for conditioning operations, the operator must pressurize the tension mechanism 80 to the desired level. Rear rolls 34, 36 may be set at a higher or lower tension than front rolls 30, 32, as desired by the operator. This is accomplished by first manipulating switch 154 such that an electrical circuit is completed through contact 156, operating solenoid valve 148 to enable pump 144 to charge the system. One or the other of the shut-off valves 168, 174 is opened at this time while the other remains closed such that pressurized oil enters the opened line, such as tension line 162, to extend front cylinders 72, 74 and bring the pressure level in that portion of the circuit up to the desired level. Meter 170 may be used to determine when the desired pressure level has been reached, at which time valve 168 may be closed to trap oil in tension cylinders 72 and 74 at the desired level. Thereupon, valve 174 may be held open in the same manner to charge the rear tension cylinders 76 and 78 until such time as the desired pressure level is indicated by meter 176. Thereupon, valve 174 is closed, trapping pressurized oil in the extended rear tension cylinders 76, 78 at the selected level. Returning switch 154 to its standby position of FIG. 9 will then allow solenoid valve 148 to close. If, for any reason, it is necessary to reduce the pressure level in either the front tension cylinders 72, 74 or the rear tension cylinders 76, 78, it is only necessary to manipulate switch 154 to establish a circuit through contact 158, thereby actuating the solenoid valve 152 to open a drain path to reservoir 142. By then opening the appropriate shut-off valve 168 or 174, the pressure level in that part of the circuit can be lowered to the desired level and then the valve 168 or 174 returned to its closed position to terminate further discharge. Returning switch 154 to its standby position of FIG. 9 correspondingly allows solenoid valve 152 to reclose.

Charging of the tension cylinders 72, 74 and 76, 78 causes the rolls 30, 32 and 34, 36 to come close together to the extent permitted by the stop structures 82 and 96. In the event that the running gap between front rolls 30, 32 needs to be changed, it is a simple matter to manipulate adjustment nuts 92 in the appropriate direction to either enlarge or reduce the running gap. Similarly, in the event that the running gap between rear rolls 34, 36 needs to be changed, it is a simple matter to manipulate nuts 104 of stop structure 96 in the appropriate direction to either enlarge or reduce the dimensions of the running gap.

As the machine moves through the field of standing crop, rotating reel 20 bends, deflects and sweeps the standing materials into sickle 18 which severs the materials from the ground and allows them to be swept upwardly and rearwardly by reel 20 into engagement with the center-gathering augers 22 and 24. Augers 22 and 24 consolidate the materials centrally while distributing them evenly across the full width of opening 26, and then transfer such materials into the conditioning mechanism 28. The front rolls 30, 32 receive the crop flow from augers 22, 24 and subject the stems of the crop flow to a crimping action as the stems pass between the intermeshed ribs of rolls 30, 32. At the same time, front rolls 30, 32 serve as feeders to propel the conditioned materials rearwardly into and through the gap between rear rolls 34, 36, which rolls grab the material and flatten the stems thereof as a result of the intermeshing bars 42. Rear rolls 34, 36 project the fully conditioned materials on rearwardly in a forceful stream that engages the forming shields 16 and is directed down to the ground in either a windrow or swath, depending upon the adjusted positions of shields 16.

The front rolls 30, 32 play an important role in that they not only lightly condition the crop, but also aggressively feed such materials into and through the rear rolls 34, 36. As a result of the aggressive feeding action provided by front rolls 30, 32, the squeeze pressure or tension supplied by rear rolls 34, 36 can, if desired, be higher than might otherwise be the case, resulting in a more effective flattening of the crop stems. Likewise, the gap between rear rolls 34, 36 can be smaller. Providing the rear rolls 34, 36 with a compressive surface such as rubber or other material is helpful in assuring positive feed of the materials through rolls 34, 36, while at the same time providing a sufficient conditioning action. Having rolls 34, 36 configured with wide, shallow lugs or bars as illustrated is also conducive to improved feeding action. And by providing the hard, preferably metal front rolls 30, 32 ahead of the softer rear rolls 34, 36, the rear rolls 34, 36 are more protected from stones and other hard objects which can be repelled and diverted by the metal conditioning rolls.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. In a machine for conditioning crop materials, the improvement comprising:
    a first pair of oppositely rotatable rolls for acting upon a stream of crop materials passing between the first rolls, said first rolls being relatively movable toward and away from one another;
    a second pair of oppositely rotatable rolls disposed to receive crop materials from the first pair of rolls for acting upon such materials as they pass between the second rolls, said second rolls being relatively movable toward and away from one another; and
    a hydraulic tension mechanism including a first hydraulic cylinder operably coupled with the first pair of rolls for supplying a tension force resisting movement of the first rolls away from one another,
    said hydraulic tension mechanism including a second hydraulic cylinder operably coupled with the second pair of rolls for supplying a tension force resisting movement of the second rolls away from one another,
    said first and second hydraulic cylinders each including valving adapted to trap pressurized fluid in the cylinders,
    said hydraulic tension mechanism further including an accumulating system hydraulically connected with the first and second hydraulic cylinders to provide a cushioning effect.

2. In the machine as claimed in claim 1, said first and second hydraulic cylinders being connected in a hydraulic circuit.

3. In the machine as claimed in claim 2, said hydraulic circuit including the valving operable when closed to trap pressurized hydraulic fluid within the first and second hydraulic cylinders.

4. In the machine as claimed in claim 3, said valving being operable when opened to allow charging of the first hydraulic cylinder with pressurized hydraulic fluid to a selected pressure level or discharging of hydraulic fluid from the first hydraulic cylinder to a selected pressure level.

5. In the machine as claimed in claim 4, said valving being operable when opened to allow charging of the second hydraulic cylinder with pressurized hydraulic fluid to a selected pressure level or discharging of hydraulic fluid from the second hydraulic cylinder to a selected pressure level.

6. In the machine as claimed in claim 5, said valving being operable to permit hydraulic fluid to be trapped in the first hydraulic cylinder at a different pressure level than hydraulic fluid trapped in the second hydraulic cylinder.

7. In the machine as claimed in claim 6, said accumulating system including a pair of compressible gas accumulators, with each accumulator being connected in flow communication with a respective one of the first and second hydraulic cylinders.

8. In the machine as claimed in claim 1, said accumulating system including a compressible gas accumulator connected in flow communication with at least the first hydraulic cylinder.

9. In the machine as claimed in claim 8, said accumulating system including a pair of compressible gas accumulators, with each accumulator being connected in flow communication with a respective one of the first and second hydraulic cylinders.

10. In the machine as claimed in claim 1, said first and second pairs of rolls presenting a pair of upper rolls and a pair of lower rolls, one of the upper rolls being fixed and the other upper roll being mounted for pivoting movement about the axis of rotation of the fixed upper roll, one of the lower rolls being fixed and the other lower roll being mounted for pivoting movement about the axis of rotation of the fixed lower roll, the movable upper roll being pivotal toward and away from the fixed lower roll, and the movable lower roll being pivotal toward and away from the fixed upper roll.

11. In the machine as claimed in claim 10, said hydraulic tension mechanism including a pair of hydraulic cylinders operably coupled with respective ones of the movable rolls, each of said hydraulic cylinders being connected in a hydraulic circuit that includes the valving operable when closed to trap pressurized hydraulic fluid within a corresponding cylinder, said valving being operable when opened to allow charging of the hydraulic cylinders with pressurized hydraulic fluid to a selected pressure level or discharging of hydraulic fluid from the cylinders to a selected pressure level.

12. In the machine as claimed in claim 11, said valving being operable to permit hydraulic fluid to be trapped in the first pair of hydraulic cylinders at a different pressure level than hydraulic fluid trapped in the second pair of hydraulic cylinders.

13. In the machine as claimed in claim 12, each of said cylinders having its own valving operable independently of the valving for the other cylinder.

14. In the machine as claimed in claim 13, each of said hydraulic cylinders having a compressible gas accumulator connected in fluid flow communication with the cylinder to provide the cushioning effect for the cylinder.

15. In the machine as claimed in claim 1, said hydraulic tension mechanism being operably coupled with the first and second pairs of rolls without springs.

16. In the machine as claimed in claim 1, said first rolls comprising a pair of non-compressible surface rolls, said second rolls comprising a pair of compressible surface rolls.

* * * * *